(12) United States Patent
Ee

(10) Patent No.: US 8,107,198 B1
(45) Date of Patent: Jan. 31, 2012

(54) PITCH MOMENT-BALANCED GIMBAL FOR A DISK DRIVE SUSPENSION

(75) Inventor: Kuen Chee Ee, Murietta, CA (US)

(73) Assignee: Magnecomp Corporation, Murrieta, CA (US)

( * ) Notice: Subject to any disclaimer, the term of this patent is extended or adjusted under 35 U.S.C. 154(b) by 416 days.

(21) Appl. No.: 12/469,530

(22) Filed: May 20, 2009

Related U.S. Application Data

(60) Provisional application No. 61/056,748, filed on May 28, 2008.

(51) Int. Cl.
*G11B 21/16* (2006.01)
(52) U.S. Cl. ............... 360/245.7; 360/245.3; 360/245.4
(58) Field of Classification Search ............... 360/245.7
See application file for complete search history.

(56) References Cited

U.S. PATENT DOCUMENTS

| | | | | |
|---|---|---|---|---|
| 5,771,136 A * | 6/1998 | Girard | ........................ | 360/245.7 |
| 5,936,803 A * | 8/1999 | Berding | .................... | 360/244.8 |
| 6,388,843 B1 * | 5/2002 | Takagi et al. | ............. | 360/245.7 |
| 6,493,188 B1 | 12/2002 | Tokisue et al. | | |
| 6,538,850 B1 * | 3/2003 | Hadian et al. | ............... | 360/245.7 |
| 6,894,873 B2 * | 5/2005 | Kasajima et al. | .......... | 360/245.3 |
| 7,236,330 B2 | 6/2007 | Suk | | |
| 7,265,945 B2 * | 9/2007 | Ueno et al. | .................. | 360/245.5 |
| 7,477,488 B1 * | 1/2009 | Zhang et al. | ............... | 360/245.7 |
| 2004/0130830 A1 * | 7/2004 | Nakamura et al. | ......... | 360/294.3 |
| 2009/0027807 A1 * | 1/2009 | Yao et al. | .................... | 360/245.1 |

OTHER PUBLICATIONS

Kuwajima et al., Develepment of Balanced-Type High Shock Suspension for 0.85-in Hard Disk Drive, Feb. 2006, IEEE Transactions on Magnetics, vol. 42, No. 2.

* cited by examiner

*Primary Examiner* — Son Mai
(74) *Attorney, Agent, or Firm* — Intellectual Property Law Offices of Joel Voelzke, APC

(57) ABSTRACT

In a disk drive suspension, a gimbal is longitudinally moment-balanced about the dimple to improve shock performance by adding weight to one side of the gimbal and/or by removing weight from the other side of the gimbal, such that when the suspension experiences an operational shock the gimbal the gimbal tends to stay level with the disk surface and not pitch relative to the disk surface. The gimbal may be moment balanced by leaving or depositing on the suspension's limiter tab the same insulative material as is used to form the flexible circuit, by increasing the mass of the limiter tab, and/or by reducing the size of the detabs or the trailing edge, or by other means.

20 Claims, 5 Drawing Sheets

PITCH MOMENT-BALANCED GIMBAL FOR A DISK DRIVE SUSPENSION

CROSS-REFERENCE TO RELATED APPLICATIONS

This application claims benefit of U.S. Provisional Patent Application No. 61/056,748 filed May 28, 2008.

BACKGROUND OF THE INVENTION

1. Field of the Invention

This invention relates to the field of disk drives. More particularly, this invention relates to the field of a pitch moment-balanced gimbal for improved shock resistance in disk drives such as magnetic hard disk drives.

2. Description of Related Art

A disk drive typically has a disk or platter of spinning disks over which read/write heads are suspended. Disk drives include both magnetic hard disk drives and optical disk drives. The present invention is applicable to disk drives generally. In a magnetic hard disk drive, a read/write head is suspended by a disk drive suspension, which is an arm-like structure which extends from an area off the disk to an area over the disk. Such suspensions commonly include a load beam, which forms the suspension's structural backbone, and a stainless steel gimbal, which allows the read/write head to slightly pitch and yaw over imperfections in the disk.

The read/write head is an electronic circuit, typically with a magnetic pickup transducer, which is formed on a slider. The slider is sometimes referred to as the "head." The slider has an aerodynamically shaped surface which produces a turbulent air bearing between it and the disk surface when the disk is rapidly spinning, sometimes approaching 15,000 rpm. The air bearing allows the slider to fly extremely closely over the disk surface without touching.

FIG. 1 is side elevation view of a simplified prior art suspension 10 and magnetic disk 50. Suspension 10 typically includes a base plate secured by a swage hub 12 to a load beam 14. Load beam 14 has a dimple 16 formed in it to support gimbal 30. Gimbal 30 has a leading edge 31 and a trailing edge 32. A slider 34 which contains the magnetic read/write head is affixed to gimbal 30. Dimple 16 provides a pivot point about which gimbal 30 and slider 34 affixed thereto can pitch and roll freely so that slider 34 can follow disk surface 52 as disk 50 flutters due to environmental shocks, imperfections in the flatness of surface 52, imperfections in the bearings upon which disk 30 turns, and other static and dynamic anomalies. Slider 34 "flies" over surface 52 of disk 50 on a cushion of air created by the air flow caused by the spinning of disk 50. This cushion of air is called an "air bearing."

The disk drive suspension 10 is designed with a cantilever spring within load beam 14 so that the spring forces slider head 34 toward the disk. The spring is flexible enough so that its "gram force" exactly opposes that of the air bearing, yet rigid enough to resist external shocks. Such shocks may be caused by a user dropping the disk drive. Shocks which occur while slider 34 is suspended over the spinning disk are called operational shock events, or "op-shock" events for shorthand.

During operational shock events, slider 34 tends to separate from the rotating disk surface 52 beyond the normal air bearing separation distance. An operational shock can therefore cause momentary failure in the reading or writing of data. In a worse case scenario, an operational shock can cause the slider to crash onto the surface of the disk causing complete failure of the disk drive.

SUMMARY OF THE INVENTION

The inventor of the present application has identified a failure mode in disk drives, namely failures caused by pitching of the slider during operational shocks, and a solution to the problem.

With reference to FIG. 1, when exposed to an upward op-shock, heads of the prior art have a tendency to rotate about a horizontal axis that is lateral to the suspension. If an upward shock is sufficiently strong, the air bearing is broken and slider 34 separates from disk surface 52 beyond the normal air bearing separation distance. When the gram force of the spring begins to force slider 34 back down toward the disk surface, which will be termed herein the rebound event, the inertia of slider 34 can be thought of as exerting an upwardly directed inertial force as indicated by the large upward arrow in the figure. The upward inertial force combined with the downward force exerted on slider 34 by dimple 16 produces a rotation in the direction indicated by the rotational arrow. That is, slider 34 rotates in the negative pitch direction and moves back toward disk surface 52 in that negative pitch attitude. For the case in which the upward shock causes load beam 14 to deflect slightly upward but the shock is not severe enough to actually disrupt the air bearing distance, as load beam 14 rebounds dimple 16 will nevertheless still exert some force on slider 34, which again has a tendency to produce rotation of slider 34 in the negative pitch direction.

The pitching rotational movement is due to an imbalance in the pitching moment. That is, the pitching movement is due to a difference between the rotational inertia of the combined gimbal 30 and slider 34 distal of the gimbal support dimple 16, and the rotational inertia of the combined gimbal 30 and slider 34 proximal of dimple 16.

The negative pitching moment of the slider reduces the shock resistance and also results in an unfavorable, negative pitch angle when the slider 34 comes back into contact with the air flow above the disk. A negative pitch angle is unfavorable because a positive pitch is preferred in order to re-establish the air bearing force that allows slider 34 to properly fly over disk surface 52. Thus, suspensions of the prior art typically have a less stable slider flying ability and unfavorable operational shock performance, due to the negative pitching moment of the combined gimbal 30 and slider 34.

The inventor has determined that many designs for disk drive suspension gimbals 30 are heavy, or more massive, toward the trailing edge, or proximal end. As used herein, the terms "distal" and "proximal" refer to the position of a component relative to the end of the gimbal that is supported. Thus, for example in FIG. 2, limiter tab 36 is said to be at the distal end of gimbal 30, and is also said to be disposed distal of slider 34. Although prior art sliders 34 themselves are sometimes positioned or oriented on a gimbal for rudimentary balancing of slider 34, the prior art neglects to pitch moment-balance the entire combined gimbal 30 and slider 34 at the suspension level.

By providing methods to pitch moment-balance combined gimbals and sliders, the invention provides designs to reduce shock induced pitch moments for better op-shock performance and slider flying stability. Modeling results have shown better pitch moments for the new design.

One aspect of the invention therefore is to pitch moment-balance the combined gimbal 30 and slider 34 longitudinally around its swivel point such as dimple 16. Pitch moment-balancing of a suspension gimbal and slider according to the present invention can be accomplished through adding a measured and positioned balancing mass, or by removing a measured and positioned amount of mass, such that the integral of the mass of the combined gimbal and slider times the absolute distance from the dimple or other point of rotation, including any pitching moment associated with the support arms or other support structure for the gimbal, is equal on both longitudinal sides of the dimple. Because sliders are usually positioned on the dimple such that the pitching moment of the slider is the same on both sides of the dimple, in practice the invention is accomplished by making the pitching moment of the gimbal itself to be equal on both sides of the dimple. Mass may be added to a limiter component attached to the gimbal, such as a limiter tab, by not etching away from a portion of the limiter tab the polyimide or other insulator that makes up the suspension's flexible circuit insulator in a subtractive manufacturing process, or by depositing such polyimide during an additive manufacturing process. Other ways to balance the suspension include making the limiter tab which extends from the gimbal on the distal side of the gimbal, which is the leading edge side, to be longer and/or wider, and/or reducing the mass on the proximal or trailing edge side of the gimbal by reducing the size of the detabs or the trailing edge, or even eliminating the detabs and the trailing edge of the gimbal altogether.

Exemplary embodiments of the invention will be further described below with reference to the drawings, in which like numbers refer to like parts.

DETAILED DESCRIPTION OF THE PREFERRED EMBODIMENTS

As used herein, the term to "longitudinally moment-balance" or "pitch moment-balance" a gimbal means to balance the gimbal such that the rotational moment of a first portion of the gimbal that is disposed longitudinally on a first side of the gimbal dimple or other pivot point about which the gimbal pivots, is substantially equal to the rotational moment of a second portion of the gimbal that is disposed longitudinally on a second side of the dimple opposite the first side.

Figure 1:
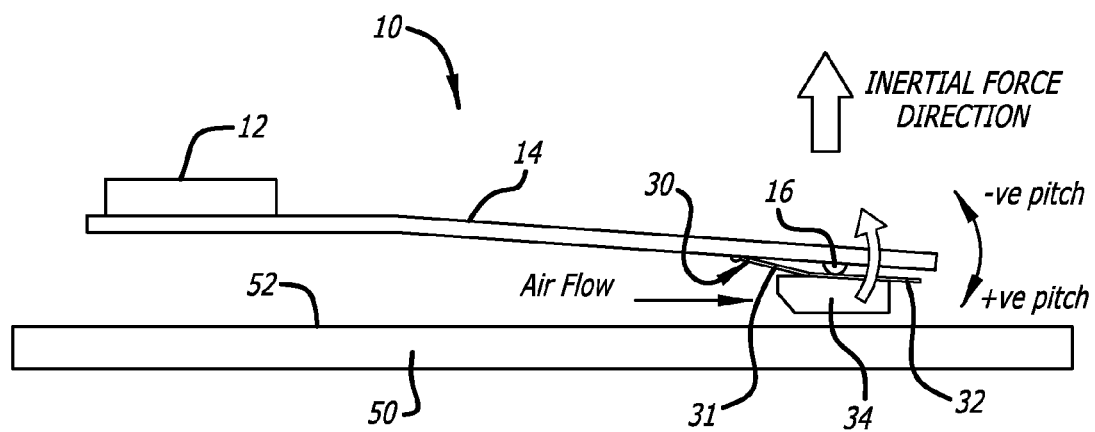
FIG. 1 is side elevation view of a simplified prior art suspension and magnetic disk.
Figure 2:
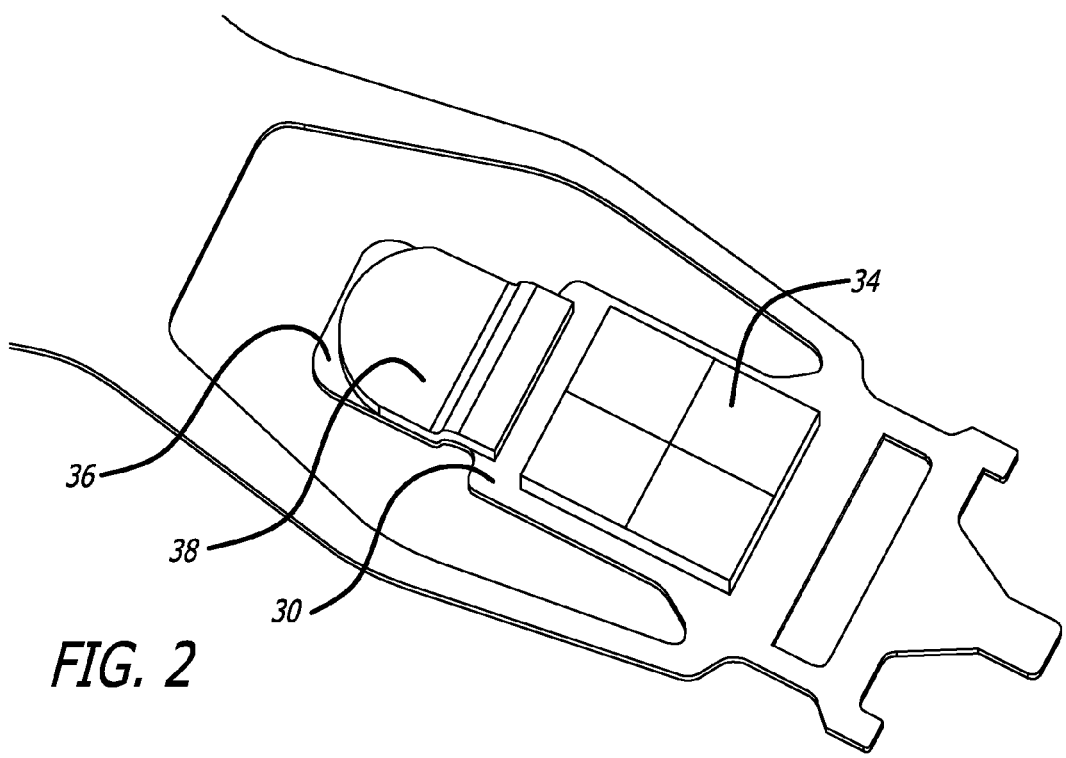
FIG. 2 is a top plan view of a suspension according to a first embodiment of the present invention, having an added weight on the suspension's limiter tab.

A first method of pitch moment-balancing a gimbal is to add mass as necessary to the longitudinal side of the gimbal that has the smaller moment. FIG. 2 is a top plan view of a suspension according to a first embodiment of the present invention, in which the suspension has a suspension travel limiter tab 36 which extends through an aperture in a load beam, which by itself is previously known, and in which a desired mass 38 is added at a position on the gimbal distal of the slider in order to moment-balance gimbal 30. More particularly, the desired balancing mass 38 is added to limiter tab 36 extending from gimbal 30.

Suspension limiters are by themselves well know features whose purposes is to prevent excessive upward or downward movement of the slider during shock conditions, which could crash the slider onto the disk and/or cause plastic deformation of the gimbal thus changing the position static attitude (PSA) of the suspension. One known type of limiter includes a limiter tab that is restrained within a U-shaped limiter, with either one of those components being formed integral with the load beam and the other of those components formed integral with the gimbal. U.S. Pat. No. 7,298,590 issued to Mei (hereafter, "Mei"), shows a limiter design in which a limiter tab is integral with the load beam, and a U-shaped limiter is integral with the gimbal. In other designs such as the embodiment shown in FIG. 2, a bent limiter tab extends through an aperture in the load beam and engages the load beam itself in order to limit vertical movement of the head. Various limiter designs are known. The present invention may be applied to suspensions having various limiter designs.

Added mass 38 can be added by microfabrication techniques, such as through deposition and plating (additive processes) or through masking and etching (subtractive processes). One well known way to manufacture a suspension including the flexible circuit thereon is to begin with a sheet of laminate that has a stainless steel layer, an insulating layer made of an insulative material such as polyimide thereon, and a conductive layer such as copper thereon. In the discussion that follows, for simplicity of discussion the insulator will be referred to as polyimide (Pi), and the conductor will be referred to as copper (Cu); however, it will be understood that the invention is equally applicable regardless of the exact materials used. The sheet of stainless steel, polyimide, and copper is selectively masked and etched in order to create the load beam and gimbal with the desired flexible circuit pattern thereon. The final suspension includes a stainless steel substrate, an insulative layer on the substrate in selected areas, and on top of the insulative layer a plurality of copper signal conductors that carry at least the data read and write signals to and from the read and write signal transducers on the slider. Such a process is generally referred to as a "subtractive" process. Although a subtractive process necessarily removes material, in this context leaving behind material that otherwise would be removed will be considered "adding mass." One method of adding mass 38 to limiter tab 36 is therefore to simply leave some polyimide or other material that would otherwise be removed during the fabrication process, or some polyimide and copper together, on limiter tab 36 instead of etching those materials away from limiter tab 36 during the normal etching steps used to produce the suspension. This method has the advantage that adding balancing mass 38 by simply not removing it during normal manufacturing requires no additional manufacturing steps or costs. Similarly, if the suspension is built up using an additive process, polyimide can be deposited on the limiter tab 36 during the same step as polyimide is deposited on the suspension to create the flexible circuit. Either way, weight can be selectively added to the gimbal without additional manufacturing steps, costs, or materials to the suspension fabrication process.

In this first embodiment, in which the step of adding mass 38 to limiter tab 36 is realized in a subtractive manufacturing process by simply not removing a selected portion of the Pi/Cu layers during the normal etching fabrication steps, limiter tab 36 is selectively etched in such a way that added weight 38 covers a portion of limiter tab 36 including the portion thereof that actually engages against the U-shaped limiter and/or the load beam. In this embodiment therefore, one of the engagement surfaces is covered by Pi or Pi/Cu, and the other is bare stainless steel. In this embodiment, therefore, the travel of gimbal 30 is limited by a stainless steel surface that is covered by either Pi or Pi/Cu bumping up against its corresponding stainless steel engagement surface.

In general and to summarize, in this embodiment a balancing weight is added to a first suspension travel limiter component that is connected to the gimbal. The first suspension travel limiter component may be a limiter tab such as shown in FIG. 2. The first suspension travel limiter component engages a second suspension travel limiter component such as a corresponding U-shaped limiter. Alternatively, the arrangement of the limiter tab and the U-shaped limiter may be switched, with the gimbal having the U-shaped limiter and the limiter tab extending from the load beam as in Mei. Still further, the limiter tab can engage the load beam itself through an aperture in the load beam as shown in FIG. 2. Either way, the gimbal has a first suspension travel limiter component connected to it and extending from it, with the first suspension travel limiter component engaging either a second suspension travel limiter component or the load beam itself. The first suspension travel limiter component has a first engagement surface that engages a corresponding second engagement surface on either the second suspension travel limiter component or the load beam itself, in order to limit the vertical travel of the slider. The added mass, which is of the same material as the insulative material in the flexible circuit in this embodiment, is sized and positioned such that the gimbal is longitudinally rotational moment-balanced about the dimple which defines the pivot point for the gimbal.

Figure 3:
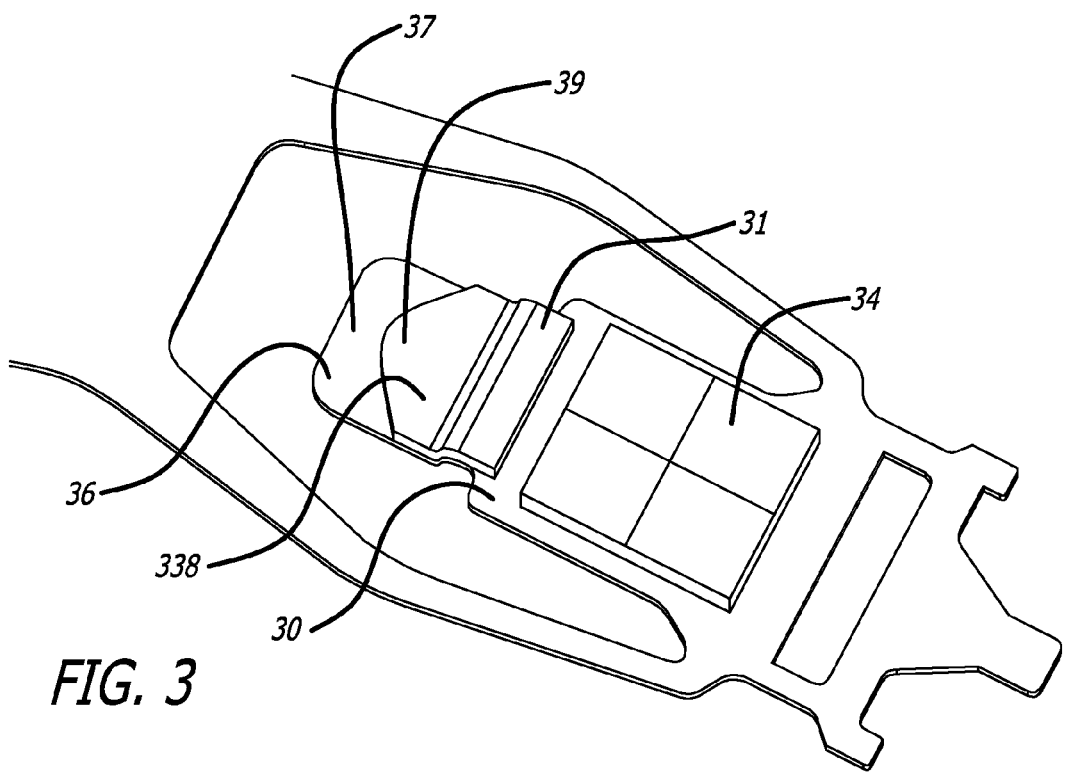
FIG. 3 is a top plan view of a suspension according to a second embodiment of the present invention, having an added weight on the suspension's limiter tab but not on the actual engagement surface thereof.

FIG. 3 shows a second embodiment which is similar to the first embodiment, except that limiter tab 36 is selectively etched in such a way that added weight 338 covers a first portion 39 of limiter tab 36, but does not cover the end portion 37 of limiter tab 36 that actually engages the corresponding engagement surface on the load beam. That is, added weight 338 does not extend to the contact surface on the limiter component. In this embodiment, therefore, the travel of gimbal 30 is limited by stainless steel bumping up against its corresponding engagement surface which is also stainless steel. That is, both engagement surfaces are bare stainless steel. This embodiment eliminates the possibility of polyimide on limiter tab 36 being scraped off through the action of the limiter and producing potentially contaminating particles; however, it is currently believed that the risk of such particle production and resulting contamination is negligible. In the embodiment as illustrated, the Pi/Cu also covers a portion 31 of gimbal 30 itself. Added weight 338 could optionally also extend into areas of gimbal 30 that are lateral to slider 34.

In the prior art, dots of polyimide are sometimes left on gimbal 30 near the slider mount area in order to oppose shrinkage of adhesive used to mount slider 34 to gimbal 30, but it is believed that polyimide is not left on limiters or their tabs, and that polyimide is not used as a balancing mass.

Figure 4A:
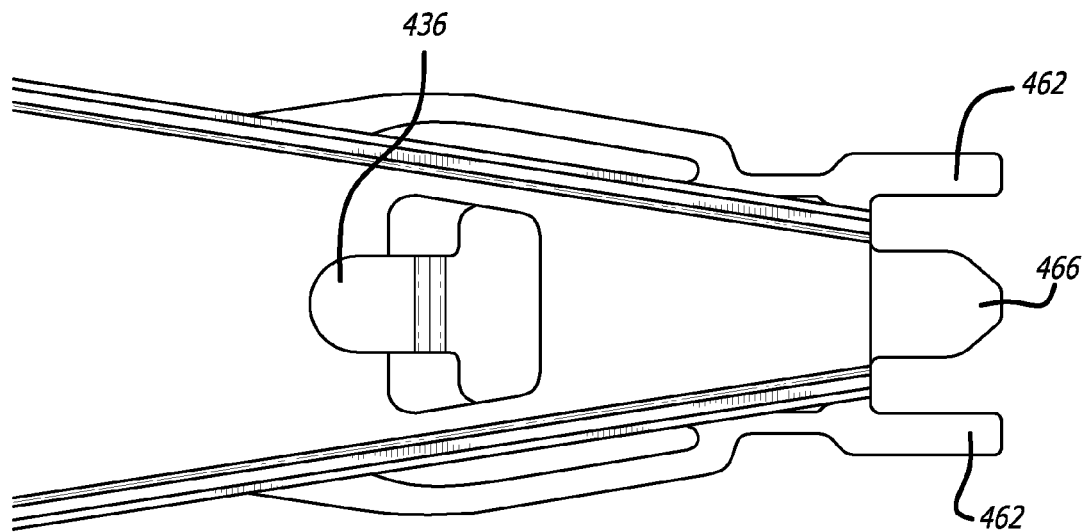
FIG. 4A is a top plan view of the gimbal area of a prior art suspension.
Figure 4B:
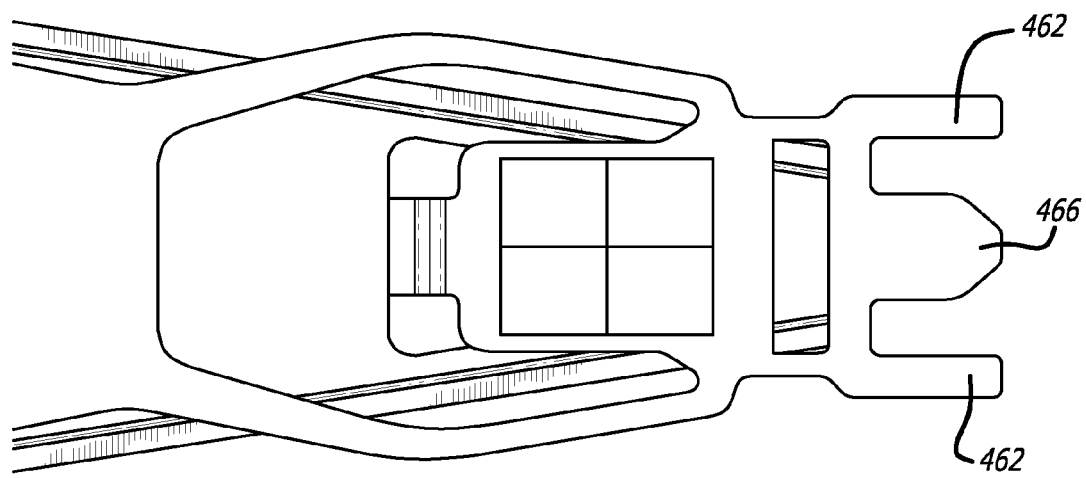
FIG. 4B is a bottom plan view of the prior art suspension of FIG. 4A.

In a third embodiment, the gimbal is moment-balanced by creating a larger gimbal limiter proximal to the slider than would be otherwise necessary. FIGS. 4A-4B show a prior art limiter tab which extends from a stainless steel gimbal through an aperture in a load beam. FIG. 4A is a top plan view of the prior art suspension, and FIG. 4B is a bottom plan view of the same suspension. The limiter tab is relatively narrow, having a width that is less than 50% of the width of the gimbal tongue.

Figure 5A:
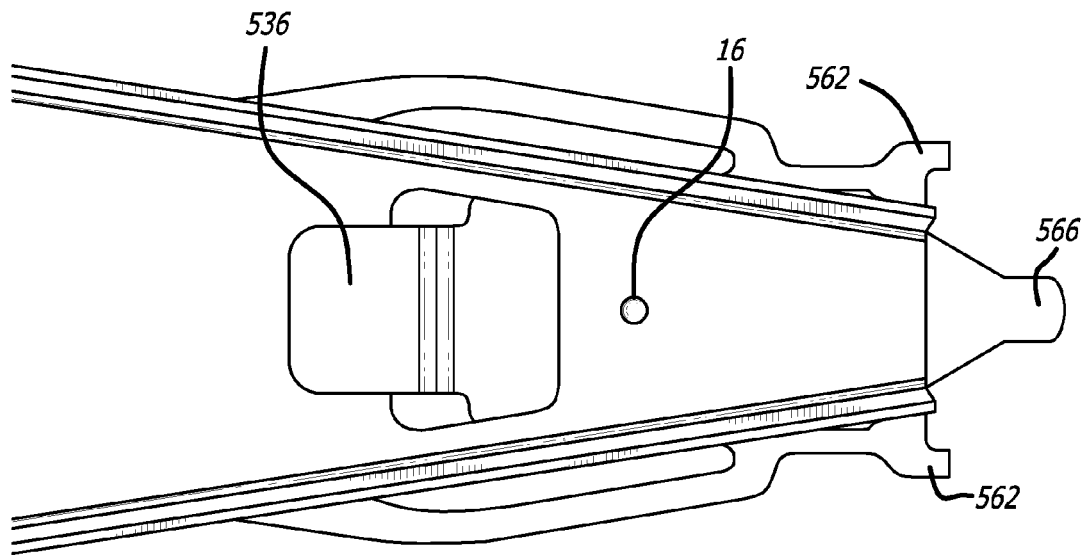
FIG. 5A is a top plan view of a suspension according to a second embodiment of the present invention.
Figure 5B:
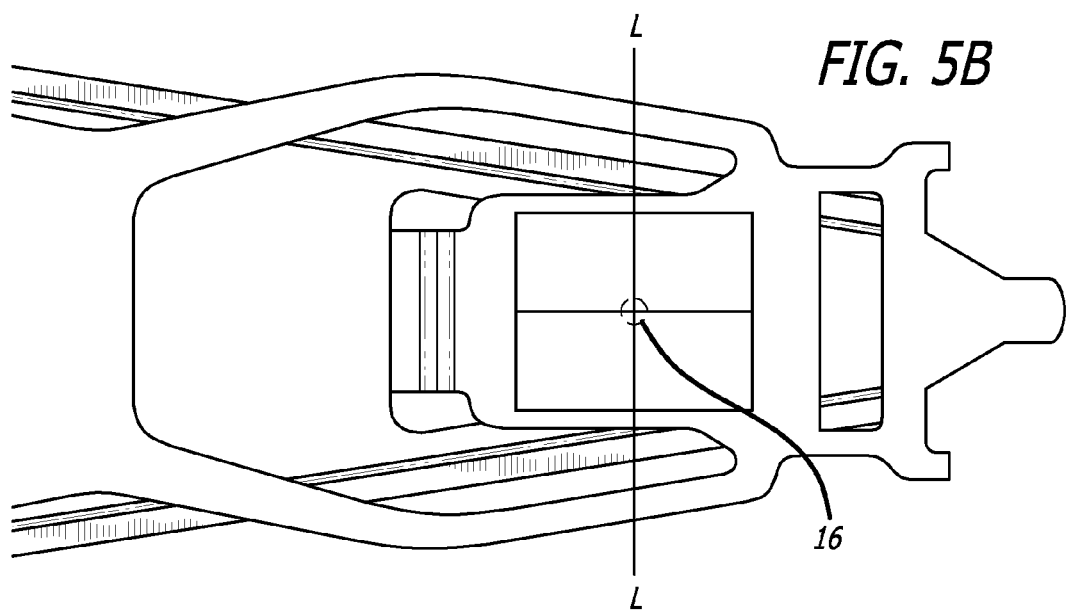
FIG. 5B is a bottom plan view the suspension of FIG. 5A.

FIGS. 5A-5B show the third embodiment of the invention in which limiter tab 536 is made to be wider than the limiter tab 436 in the prior art. FIG. 5A is a top plan view of an embodiment according to this third embodiment of the invention in which the width of limiter tab 536 has been increased, and FIG. 5B is a bottom plan view of the same suspension. It has been found that a limiter width of greater than 50% of the tongue width is effective, and a limiter width of approximately 70% of the tongue width is preferred. Such wider, larger limiter tabs contain the mass necessary to help moment-balance the gimbal. The stainless steel gimbal limiter may also be thicker than the rest of the gimbal.

In another embodiment, the gimbal is moment-balanced by removing material on the gimbal located on the proximal side of the gimbal. Referring back to prior art FIGS. 4A-4B, two tooling struts or detabs 462, which resemble horns, are left extending from the gimbal stainless steel. Detabs 462 are artifacts of manufacturing processes to align the flexure gimbal to the load beam. A center section trailing edge 466 of the gimbal, between the two detabs 462, is also left extending from the gimbal. During parking of the heads when the disk drive is to be turned off, trailing edge 466 engages a ramp within the disk drive, with the ramp supporting the gimbal to prevent it from moving vertically. Trailing edge 466 thus serves a head parking function.

FIGS. 5A-5B show this embodiment in which detabs 562 are partially removed and trailing edge 566 is narrowed in order to remove mass from the end of the gimbal that is proximal of dimple 16. Detabs 562 are made to be shorter than trailing edge 566. That is, detabs 562 have a shorter length than does trailing edge 566. Limiter tab 536 is also visible. To significantly reduce mass, it has been found that limiting the length of detabs 562 to no more than half the length of the distance from which the trailing edge 566 of the gimbal protrudes from the gimbal body is effective to help moment-balance the gimbal. In the embodiment shown, detabs 562 have a length that is less than half the length of trailing edge 566. More particularly, detabs 562 have a length that is less than a quarter of the length of trailing edge 566. More particularly still, detabs 562 have a length that is about one sixth the length of trailing edge 566. In this way, the gimbal is pitch moment-balanced such that the pitching moment of the combined gimbal and slider to the right of line L-L running laterally across the suspension through dimple 16 is substantially equal to the pitching moment of the combined gimbal and slider to the left of that line. As used herein, the term "removed" should be understood in its broad sense to include both removal as well as not forming the detabs and/or trailing edge in the first place, or forming the detabs and/or trailing edge to be shorter and/or narrower than in prior art suspensions compared to the rest of the suspension.

Figure 6A:
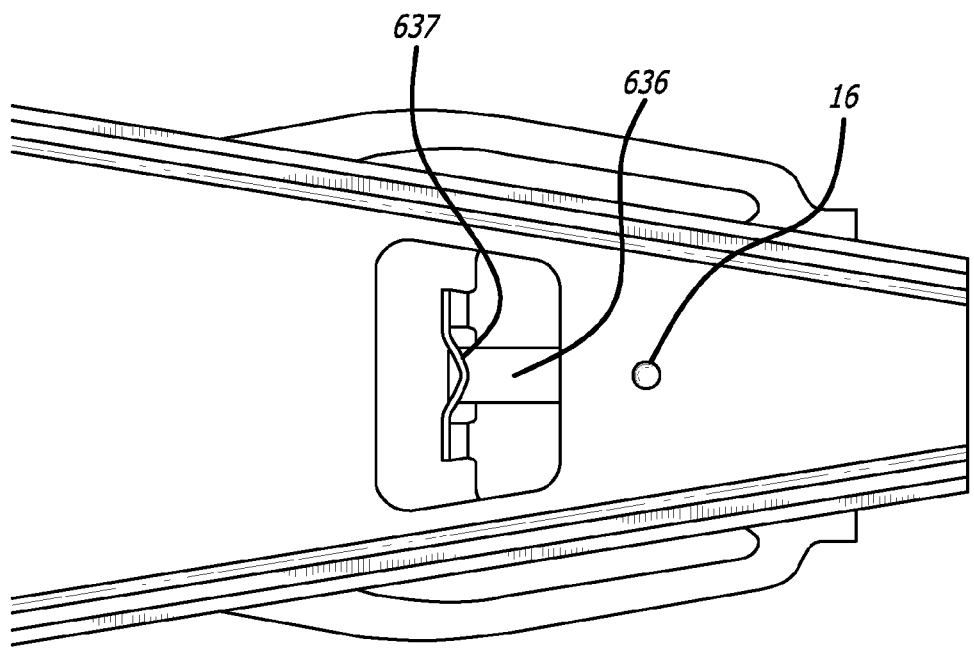
FIG. 6A is a top plan view of a suspension according to a third embodiment of the present invention.
Figure 6B:
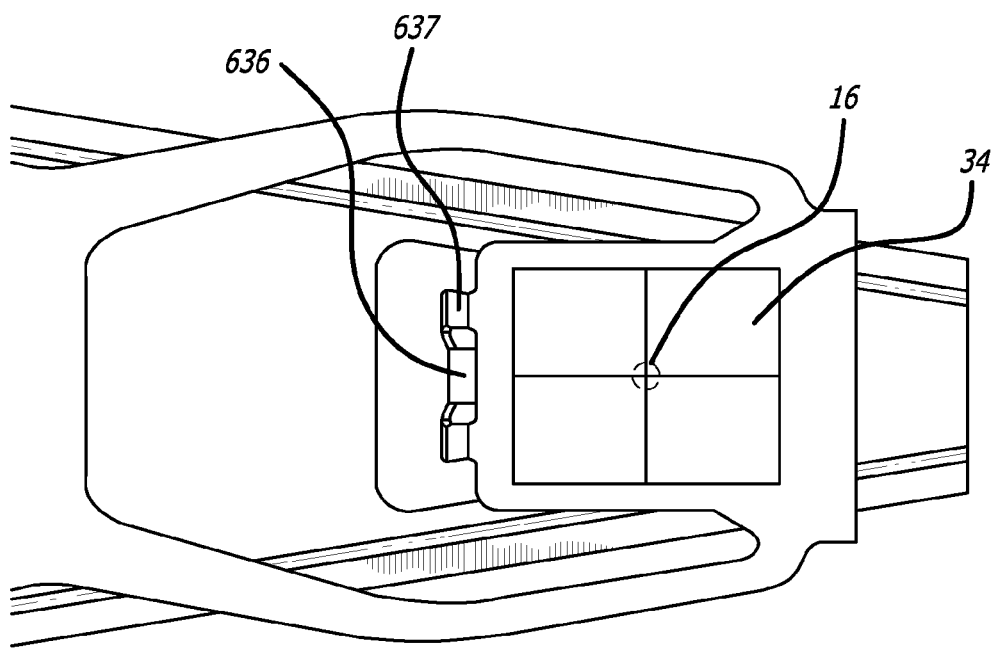
FIG. 6B is a bottom plan view of the suspension of FIG. 6A.

In yet another embodiment, the gimbal is moment-balanced by completely removing the detabs and trailing edge of the gimbal. FIGS. 6A-6B show the detabs and trailing edge of the gimbal completely removed from the gimbal. In this embodiment, there is no trailing edge to perform the head parking function which the trailing edge performs in a standard suspension. In order to compensate for the loss of the support which was provided in the prior art to the gimbal by the trailing edge when the heads are parked, the suspension limiter 637 is moved closer to slider 34 as shown in FIG. 6B. Moving limiter 637 closer to slider 34 significantly limits vertical movement of slider 34 when the heads are parked even though slider 34 is no longer supported at its trailing edge. In the embodiment shown, the farthest extent of limiter 637 when it abuts limiter tab 636 is less than a distance of 0.75 $L_S$ from dimple 16, where $L_S$ is the longitudinal length of the slider 34.

In a further embodiment not illustrated, the combined slider and gimbal is moment-balanced by positioning the slider asymmetrically on the dimple in such a way that the combined slider and gimbal are pitch moment-balanced.

Moment-balancing can be performed with respect to the gimbal mass around the gimbal swivel point, typically a load beam dimple 16. Moment-balancing the gimbal around the dimple should be performed such that the pitch rotational moments on either side of the dimple are equal to within 20%, and more preferably to within 10%, and more preferably still to within 5% and still more preferably to within 2%, in order to prevent large pitch movement of the slider during op-shock events. That is, the pitch rotational moments on either side of the gimbal are balanced to a 20% accuracy, and more preferably to within a 10% accuracy, and still more preferably to within 5% accuracy, and more preferably still to within 2% accuracy.

In accordance with the invention, a properly moment-balanced disk drive suspension gimbal alleviates negative pitch moments caused by body inertia during shock events. Thus, during a 400 G (four hundred times the force of gravity) shock event over two milliseconds, a properly moment-balanced gimbal was shown via simulation to experience a pitch moment of less than 0.2 μNm (micro-Newton-meters), or even below 0.1 μNm for some advanced designs. These low moments result in less undesirable negative pitch of the slider.

Also in accordance with the invention, a properly moment-balanced disk drive suspension alleviates negative gimbal pitch. Thus, during a 400 G shock event over two milliseconds, a properly moment-balanced gimbal was shown via simulation to experience a gimbal pitch of less than 0.5 degrees from its nominal attitude, or even less than 0.2 degrees for a typical gimbal pitch stiffness value of approximately 0.55 μNm/deg. This is in comparison with prior art, non-moment-balanced gimbals of the same gimbal pitch stiffness value which experience gimbal pitch angles of approximately 0.8 degrees under the same shock conditions. The smaller deviations from a nominal flying attitude of the present invention allow the air bearing to be reestablished quickly after an upset event. Furthermore, because the pitch angle deviations are reduced from the angle deviations in the prior art, the disk drives which incorporate the suspensions can be rated for higher shock extremes.

In addition to being longitudinally moment-balanced, i.e., pitch moment-balanced, it is also desirable that the combined gimbal and slider be laterally moment-balanced, i.e., roll moment-balanced. Mass can be added or removed on one lateral side or the other of the gimbal as necessary in order to laterally moment-balance the combined gimbal and slider.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, in general, any mass of any material can be added in various ways including but not limited to deposition, adhesion, welding, and non-removal in a subtractive manufacturing process, in order to increase the pitching rotational moment on one side of the dimple. Similarly, mass can be removed in various manners from the gimbal, its support, and/or the slider on one side of the dimple in various ways including but not limited to cutting, etching, and laser ablation, in order to decrease its pitching rotational moment. Alternatively, the slider itself can be moved forward or backward relative to the dimple, or the slider can be made moment-asymmetric, in order to balance out an asymmetric pitching moment of the gimbal, such that the combined gimbal and slider have equal pitching moments on both sides of the dimple or other point of rotation.

The invention has been discussed with respect to a prior art suspension in which the gimbal has a greater rotational moment at the trailing half of the gimbal as is believed to be most common; however, the invention can be applied equally to prior art suspensions in which the leading half of the gimbal has the greater rotational moment before balancing. Either way, mass is added and/or removed on one or both longitudinal sides of the dimple such that the gimbal, and more generally the combined gimbal and slider, will have substantially the same rotational moment on both longitudinal sides of the gimbal such that during a shock event the slider does not appreciably pitch, and if the slider separates from the air bearing, upon spring back the slider approaches the disk surface in an attitude of little no pitch angle, or possibly a slightly positive pitch angle to help reestablish the air bearing between the slider and the spinning disk surface. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A disk drive suspension comprising:
   a load beam;
   a flexible circuit, the flexible circuit comprising an insulative material and at least one signal conductor;
   a gimbal connected to the load beam;
   a slider including a data transducer for reading data from a disk, the signal conductor being operatively connected to the transducer; and
   a first suspension travel limiter component extending from the gimbal and located at a distal end thereof, the first suspension travel limiter component engaging at least one of the load beam and a second suspension travel limiter component connected to the load beam to thereby limit vertical travel of said slider;
   wherein said first suspension travel limiter component has material thereon comprising the same material as said insulative material.

2. The disk drive suspension of claim 1 wherein said first suspension travel limiter component is a limiter tab.

3. The disk drive suspension of claim 1 wherein said insulative material on the first suspension travel limiter component is sized and positioned such that the gimbal is longitudinally rotational moment-balanced about a dimple which defines a pivot point for the gimbal.

4. A disk drive suspension comprising:
   a load beam and a gimbal pivotally connected to the load beam, the gimbal pivoting about a gimbal pivot point;
   a first limiter component attached to the gimbal, the first limiter component having a limiting contact surface that engages at least one of the load beam and a second suspension travel limiter component connected to the load beam to thereby limit vertical travel of the gimbal; and insulative material on the first limiter component on a surface thereof, the insulative material not extending to the limiting contact surface;

wherein the gimbal is longitudinally moment-balanced around the pivot point by the insulative material.

5. The suspension of claim 4 wherein the gimbal is longitudinally moment-balanced around the pivot point to within a 20% accuracy.

6. The suspension of claim 4 wherein the gimbal is longitudinally moment-balanced around the pivot point to within a 5% accuracy.

7. The suspension of claim 4 wherein the gimbal is longitudinally moment-balanced around the pivot point to within a 2% accuracy.

8. The suspension of claim 4 wherein the insulative material comprises at least one material of which a flexible circuit on the suspension is also comprised.

9. The suspension of claim 8 wherein the insulative material comprises polyimide.

10. The suspension of claim 8 wherein the first limiter component comprises a suspension travel limiter tab.

11. A disk drive suspension comprising a load beam and a gimbal pivotally connected to the load beam, the gimbal pivoting about a gimbal pivot point, wherein the gimbal is longitudinally moment-balanced around the pivot point, wherein:

the gimbal has a detab and a trailing edge; and the detab protrudes no more than half a distance than a distance which the trailing edge protrudes.

12. The suspension of claim 4 wherein the first limiter component comprises a limiter tab extending from the gimbal, the gimbal having a tongue to which the slider is mounted, the limiter tab having a width of more than 50% of a width of the tongue.

13. The suspension of claim 12 wherein the width of the limiter tab is around 70% of the width of the tongue.

14. The suspension of claim 4 wherein the gimbal is also laterally moment-balanced around the pivot point.

15. The suspension of claim 4 wherein:

the outer distance of the first limiter component from the gimbal pivot point does not exceed 0.75 Ls where $L_S$ is the longitudinal length of the slider.

16. The suspension of claim 4 wherein the gimbal is moment-balanced such that during a 400 G shock over two milliseconds, the gimbal experiences a pitch moment of less than 0.2 μNm.

17. The suspension of claim 4 wherein the gimbal is moment-balanced such that during a 400 G shock over two milliseconds, the gimbal experiences a pitch of less than 0.5° from a nominal attitude of the gimbal.

18. The suspension of claim 17 wherein the gimbal is moment-balanced such that during a 400 G shock over two milliseconds, the gimbal experiences a pitch of less than 0.2° from a nominal attitude of the gimbal.

19. The suspension of claim 1 wherein said first travel limiter component has an engagement surface that contacts another component to limit vertical travel of the gimbal, and said engagement surface does not have insulative material on it.

20. The suspension of claim 1 wherein said first travel limiter component has an engagement surface that contacts another component to limit vertical travel of the gimbal, and said engagement surface is covered by said insulative material.

* * * * *